(12) United States Patent
Schlenk et al.

(10) Patent No.: US 8,624,520 B2
(45) Date of Patent: Jan. 7, 2014

(54) ELECTRICAL APPLIANCE HAVING A LIGHTING DEVICE HAVING LIGHT EMITTING DIODES

(75) Inventors: Manfred Schlenk, Augsburg (DE); Robert Weger, Wels (AT)

(73) Assignee: Minebea Co., Ltd., Nagano-ken (JP)

( * ) Notice: Subject to any disclaimer, the term of this patent is extended or adjusted under 35 U.S.C. 154(b) by 269 days.

(21) Appl. No.: 13/098,517

(22) Filed: May 2, 2011

(65) Prior Publication Data

US 2011/0266964 A1 Nov. 3, 2011

(30) Foreign Application Priority Data

Apr. 30, 2010 (DE) .......................... 10 2010 019 182
May 14, 2010 (DE) .......................... 10 2010 020 483

(51) Int. Cl.
*H05B 41/16* (2006.01)

(52) U.S. Cl.
USPC .................. 315/276; 315/205; 315/185 R (58) Field of Classification Search
USPC .......... 315/178, 200 R, 185 R, 205–207, 272, 315/276, 277
See application file for complete search history.

(56) References Cited

U.S. PATENT DOCUMENTS

| 5,524,334 | A | * | 6/1996 | Boesel | ............................ 29/605 |
| 6,104,146 | A | * | 8/2000 | Chou et al. | ..................... 315/277 |
| 7,196,483 | B2 | * | 3/2007 | Wey et al. | ..................... 315/312 |
| 7,285,921 | B2 | | 10/2007 | Chen | |
| 2006/0284569 | A1 | | 12/2006 | Wey et al. | |
| 2007/0024202 | A1 | * | 2/2007 | Lee | ................. 315/160 |
| 2010/0039037 | A1 | | 2/2010 | Yamane et al. | |
| 2010/0295471 | A1 | * | 11/2010 | Ishikura et al. | ............... 315/294 |

FOREIGN PATENT DOCUMENTS

KR  1020080023812  3/2008
WO  2008152565  12/2008

* cited by examiner

*Primary Examiner* — James H Cho
(74) *Attorney, Agent, or Firm* — Volpe and Koenig, P.C.

(57) ABSTRACT

An electrical appliance, particularly a television or a monitor, having a lighting device (8) having light emitting diodes (12). The light emitting diodes (LED) (12) are collected in LED strings (11) and controlled by a balancing network (17). The balancing network (17) has a circuit branch (19) for each string (11), the circuit branches (19) being connected in parallel to each other. Disposed in each circuit branch (19), is a bridge rectifier (20) to which the LED string (11) is connected. Moreover, each circuit branch has a balancing transformer (23), wherein all the secondary windings (26) of the balancing transformer (23) are connected in series in a closed conductor loop (27), by which the currents in all circuit branches are balanced.

11 Claims, 5 Drawing Sheets

ELECTRICAL APPLIANCE HAVING A LIGHTING DEVICE HAVING LIGHT EMITTING DIODES

CROSS-REFERENCE TO RELATED APPLICATIONS

This application claims the benefit of German Patent Application No. 10 2010 019 182.5, filed Apr. 30, 2010, and German Patent Application No. 10 2010 020 483.8, filed May 14, 2010, both of which are incorporated herein by reference as if fully set forth.

BACKGROUND

The invention relates to an electrical appliance having a lighting device having light emitting diodes.

This kind of appliance is, for example, a flat-screen television having a liquid crystal display and a light emitting diode backlight.

Figure 1:
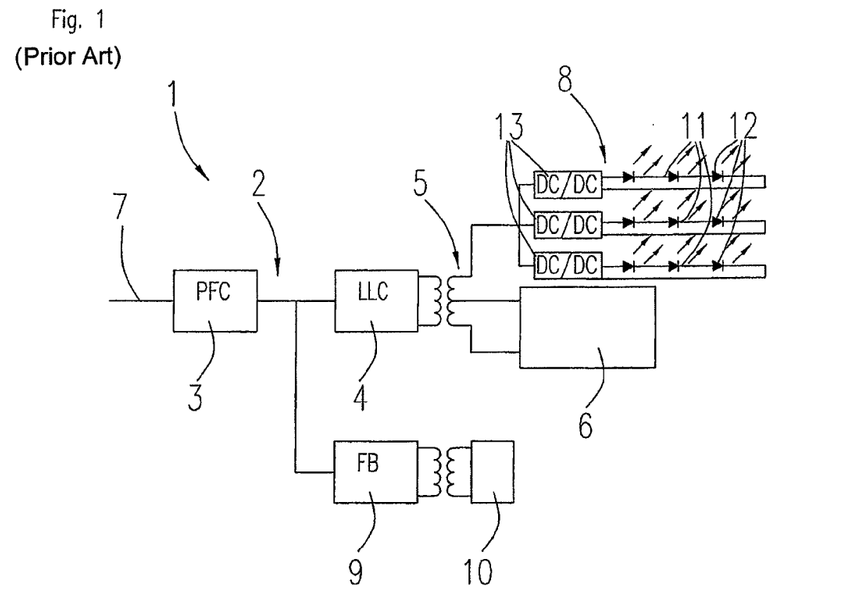
FIG. 1 a block diagram of a television having a light emitting diode backlight according to the prior art, FIG. 2 a block diagram of a television according to the invention, FIG. 3 a block diagram of a television according to the invention having a device to control a standby mode, FIG. 4 a circuit diagram of the balancing network for controlling the light emitting diodes, FIG. 5 an E-I core of a balancing transformer, FIG. 6 several E-cores of several balancing transformers having a common I-core, FIG. 7 a detail of the DC voltage/AC voltage converter with the switching elements and the connection to the balancing network, FIG. 8 the voltage waveform at the high-frequency transformer in the switching intervals of the switching elements and FIG. 9 the waveform over time of the control signals for controlling the switching elements.

FIG. 1 shows a block diagram of such a television according to the prior art.

The television 1 has a mains connection 7 to supply power via the main power grid. A voltage supply 2 having a power factor correction circuit (PFC) 3 is disposed at the mains connection 7. Connected to the output of the PFC 3 is a DC/DC converter 4 that provides several secondary voltages 5 for various subsystems 6 of the television 1. The backlight 8 is supplied via one of these secondary voltages 5.

Connected downstream of the PFC 3, there is moreover an additional voltage converter 9 by means of which a circuit 10 to monitor and control a standby mode of the television 1 is supplied. The backlight 8 consists of a plurality of light emitting diode strings 11 in which a plurality of light emitting diodes (LED) 12 are disposed. Since individual light emitting diodes 12 are subject to series fluctuations, at a constant voltage, the same current does not flow into each string 11, thus also causing a deviation in brightness. To ensure homogeneous brightness for the backlight 8 over the entire surface, the current in the individual strings has to be adjusted.

Hence each string 11 has an additional DC/DC converter 13 by means of which the DC voltage for each string 11 can be separately regulated. This separate voltage control is mainly used to achieve current balancing of the individual strings 11. In addition, however, the brightness of the individual strings 11 has to be separately regulated in order to dim the backlight 8, since other consumer loads 6 are also connected to the main voltage converter 4.

Since it is necessary to have a separately adjustable voltage converter in each string, the circuit is made complex and expensive.

In addition, the overall efficiency of the voltage supply is impaired by the additional voltage converters of the individual strings.

SUMMARY

The object of the invention is thus to produce an appliance of the kind described above in which the power supply unit of the lighting device is simpler and more cost-effective and has higher overall efficiency.

This object has been achieved with an appliance according to the invention.

The electrical appliance according to the invention has a power supply unit and a lighting device having light emitting diodes, wherein the power supply unit has a mains connection, a voltage converter and a high-frequency transformer, wherein the lighting device has a current balancing network to control the light emitting diodes that is connected to the high-frequency transformer, wherein the light emitting diodes are collected in individual strings and each string has at least one light emitting diode, wherein each string is disposed in a circuit branch of the current balancing network and the circuit branches are connected in parallel, wherein in each circuit branch, the LED string is connected to the output of a bridge rectifier, an input of the bridge rectifier is connected to the high-frequency transformer and the other input of the bridge rectifier is connected to the primary winding of a transformer and the secondary winding of the transformer is connected in series to the secondary windings of the transformer in the parallel circuit branches in a closed loop.

The advantage here is that current balancing in the individual circuit branches takes place passively. Since the secondary windings of all circuit branches are connected in series, the current is automatically the same in all the secondary windings. As a result, the current in the primary circuits is also balanced. This means that the current need not be laboriously regulated separately in each circuit branch using the voltage. The circuit is thus made considerably more simple and cost-effective.

Moreover, since only passive components are used in the balancing network, the overall efficiency of the power supply unit is not changed and certainly not impaired. Compared to the prior art, the electrical appliance according to the invention thus has improved overall efficiency by several percentage points.

In a preferred embodiment of the invention, only the current balancing network is connected to the voltage converter. To provide other voltages for the supply of further functional parts of the appliance, another voltage converter is connected to the power factor correction circuit.

A particularly preferred embodiment of the invention provides that in each circuit branch, a capacitor is connected in parallel to the primary winding of the balancing transformer. The capacitors help to improve the balancing quality and/or allow the balancing transformers to be made smaller and thus more space-saving and cost-effective. To this end, the capacitors have to be chosen such that the parallel resonance frequency of the oscillating circuit formed with the main inductance of the transformer lies within the range of the operating frequency.

It is expedient if each balancing transformer has a core made, for example, of ferrite, where the core can be given almost any shape.

It is preferable if each balancing transformer has an E-I core, particularly with coils integrated in the layout.

In another preferred embodiment, each balancing transformer has an E-core and all the E-cores are connected via a common I-core, an air gap preferably being formed between the E-cores and I-core.

In addition, the power supply unit of the appliance according to the invention may have a power factor correction circuit should the overall power consumption be greater than momentarily 50 W.

The invention moreover describes a method by which the brightness of the light emitting diodes of the lighting device of an electrical appliance according to the invention can be changed.

The method makes possible particularly low-loss control of the light emitting diodes and contains means for the active and passive damping of interference signals.

According to the invention, the DC voltage/AC voltage converter (DC/AC converter), which generates an operating AC voltage for the balancing network from the output DC voltage of the PFC, is operated using the zero voltage switching method (ZVS method) in order to increase energy efficiency. Here, the switches of the voltage converter are always switched at the zero crossing of the AC voltage. In this way, no current spikes occur that would otherwise be produced during charge reversal of the parasitic capacitors of the switches when high voltages are switched. However, the switching time is consequently fixed, so that the LED current can no longer be changed by pulse width modulation (PWM) using the switching times.

According to the invention, the lamp current is changed via the input voltage of the DC/AC voltage converter. This makes it possible for the operating frequency of the AC voltage to be held constant at a value at which interference with other systems of the electrical appliance does not occur.

The input voltage of the DC voltage/AC voltage converter is the output voltage of the power factor correction circuit (PFC). In this method, the PFC voltage is increased or decreased until the desired lamp current and thus the desired brightness is achieved.

The LED current is also temperature-dependant to a certain extent, so that the PFC voltage can be adjusted accordingly.

The PFC output voltage is generally not an ideal DC voltage. Typically, an AC voltage is superimposed on the DC voltage, the AC voltage having an approximate frequency of 100 Hz to 120 Hz, depending on the mains frequency. The amplitude of the AC voltage is approximately 5% to 10% of the output DC voltage. These voltage fluctuations directly cause current fluctuations in the secondary circuit of the high-frequency transformer, which may ultimately be perceived as a flicker in the lighting device. In order to reduce this residual ripple in the PFC voltage, the current control is allocated another control circuit by means of which the switching times of the switches in the voltage converter can be varied. However, this variation can only be effected within narrow limits, so as to ensure zero voltage switching is maintained. This makes it possible, however, to reduce current variation to 2% to 3%.

Further impairment to the LED current can be caused by low-frequency audio signals (bass). Here again, an additional control may be provided that can change the PFC output voltage in such a way that even these kinds of dynamic and irregularly occurring interferences can be compensated. For this purpose, the dynamics of the PFC control circuit are adjusted to the audio signals.

BRIEF DESCRIPTION OF THE DRAWINGS

Preferred embodiments of the invention are described in more detail below with reference to the attached drawings.

The drawings show.

DETAILED DESCRIPTION OF THE PREFERRED EMBODIMENT

The invention is shown below on the basis of a television having a liquid crystal screen and a LED backlight.

Figure 2:
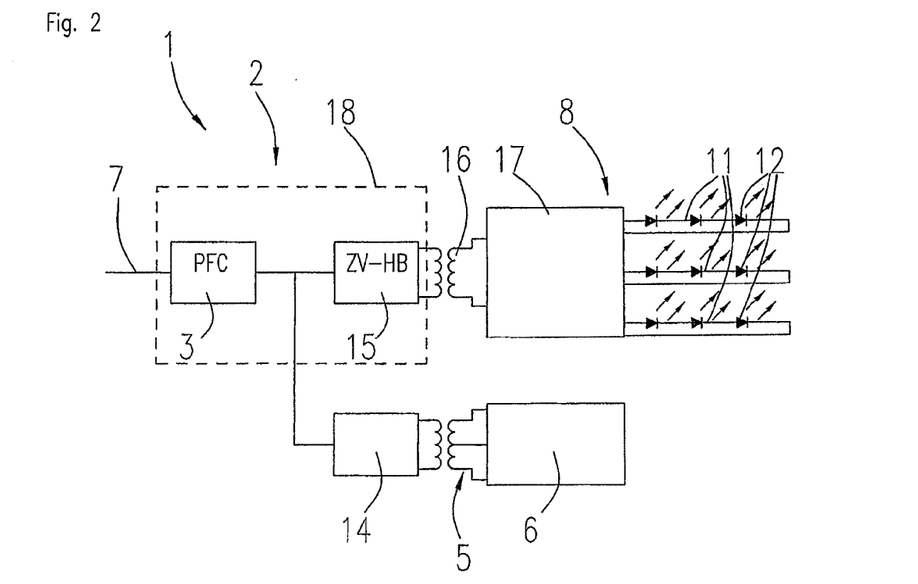

FIG. 2 shows a block diagram of such a television 1 according to the invention, only those parts relevant to the invention being shown.

The television has a power supply unit 2 that is connected to the mains voltage 7. In the illustration, the power supply unit 2 has a power factor correction circuit (PFC) 3 and two voltage converters 14, 15 connected to the PFC. The PFC delivers a DC voltage that lies in the approximate range of 400V to 500V. This PFC voltage acts as an input voltage for the two voltage converters 14 and 15. The first voltage converter 14 is designed as a DC voltage/DC voltage converter (DC/DC converter) and provides a plurality of output DC voltages 5 for various subsystems 6 of the television 1, such as the receiver and the audio and video systems.

Figure 7:
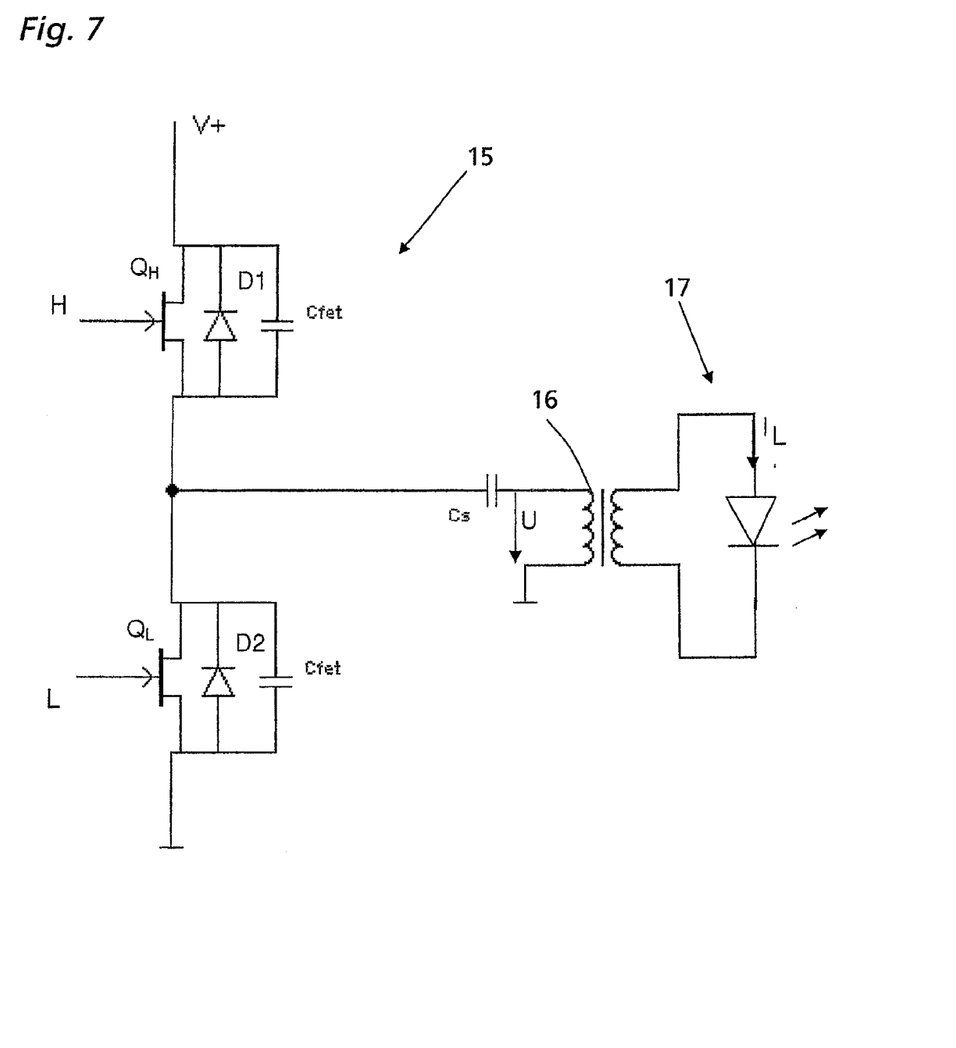

The second voltage converter 15 is designed as a DC voltage/AC voltage converter (DC/AC converter) and is provided solely for the power supply of the backlight 8, the voltage converter 15 delivering high-frequency AC voltage. The voltage converter 15 has a half-bridge switch having two switching elements $Q_H$, $Q_L$, as shown in FIG. 7. The switching elements $Q_H$, $Q_L$ are alternately switched so as to generate the output AC voltage. Here, the operating frequency is approximately 40 kHz. The switching elements $Q_H$, $Q_L$ are designed as semiconductor power switches, preferably MOSFETs, and are connected via a coupling capacitor Cs to the primary winding of the high-frequency transformer 16. The coupling capacitor Cs, the primary winding and the parasitic capacitors $C_{fet}$ of the MOSFETs form an oscillating circuit in that an approximately sinus-shaped alternating current is created. This alternating current is reduced via the transformer 16 to a voltage suitable for light emitting diodes.

The switching elements $Q_H$, $Q_L$ each have parasitic diodes D1 and D2. A balancing network 17 is connected via a high-frequency transformer 16 to the voltage converter 15. The light emitting diodes 12 are disposed in a plurality of LED strings 11, each string being connected to the balancing network 17. For the sake of simplicity, the balancing network is illustrated in FIG. 7 using a single light emitting diode.

The PFC 3 and the second voltage converter 15 for supplying power to the backlight 8 are arranged in the embodiment in an integrated circuit 18.

Figure 4:
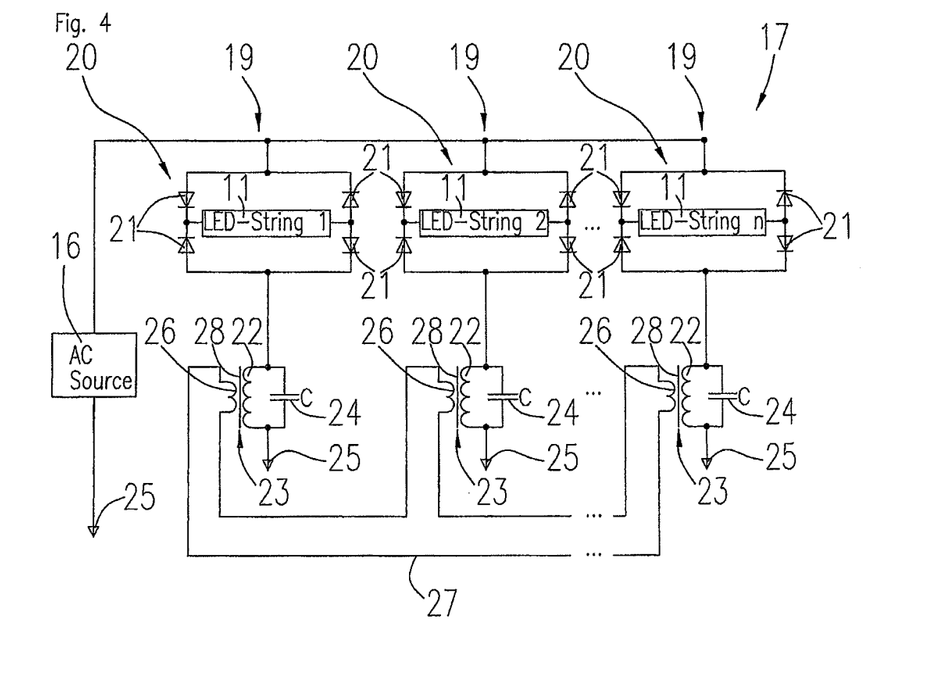

In FIG. 4, an embodiment of the balancing network 17 is shown by way of example using a circuit diagram. The circuit has a plurality of parallel, identical circuit branches 19. In each branch 19, a bridge rectifier 20 is disposed that is made up of four semiconductor diodes 21.

The LED string 11 is connected to the output of the bridge rectifier 20. Since light emitting diodes only conduct a current in one direction, the bridge rectifier 20 ensures that the light emitting diodes 12 are operated in both half cycles of the operating AC voltage 16 in the correct direction of current.

One input pole of the bridge rectifier 20 is connected to the high-frequency transformer 16. The other input pole is connected to a pole of the primary winding 22 of a balancing transformer 23. Connected in parallel to the primary winding 22 is a capacitor 24 by means of which a parallel oscillating circuit is formed consisting of the coil 22 and the capacitor 24. The second pole of the primary winding is connected to ground 25. Here, the capacitor 24 is chosen such that the resonance frequency of the parallel oscillating circuit lies within the frequency range of the AC voltage of the high-frequency transformer 16.

The secondary windings 26 of the balancing transformer 23 of all circuit branches 19 are connected in series to one another in a closed conductor loop 27.

According to Kirchhoff's law concerning nodes, due to the connection in series, the current in all secondary coils 26 is identical. The balancing transformers 23 are preferably all the same so that, due to similar transfer ratios, the currents on the primary side of the transformer 23 are also identical. Thus, the current that flows through the LED strings 11 is identical in all circuit branches 19. The advantage arising from the use of such passive current balancing is that only simple and low-cost components are needed and there is no need for any active control of the current by changing the voltage. As a result, the circuit is not only made simpler and more cost-effective, but it also shows improved efficiency compared to the prior art.

It is possible to change the brightness of the backlight (dimming) using a well-known method, such as pulse width modulation, by changing the voltage of the voltage converter 15.

Figure 8:
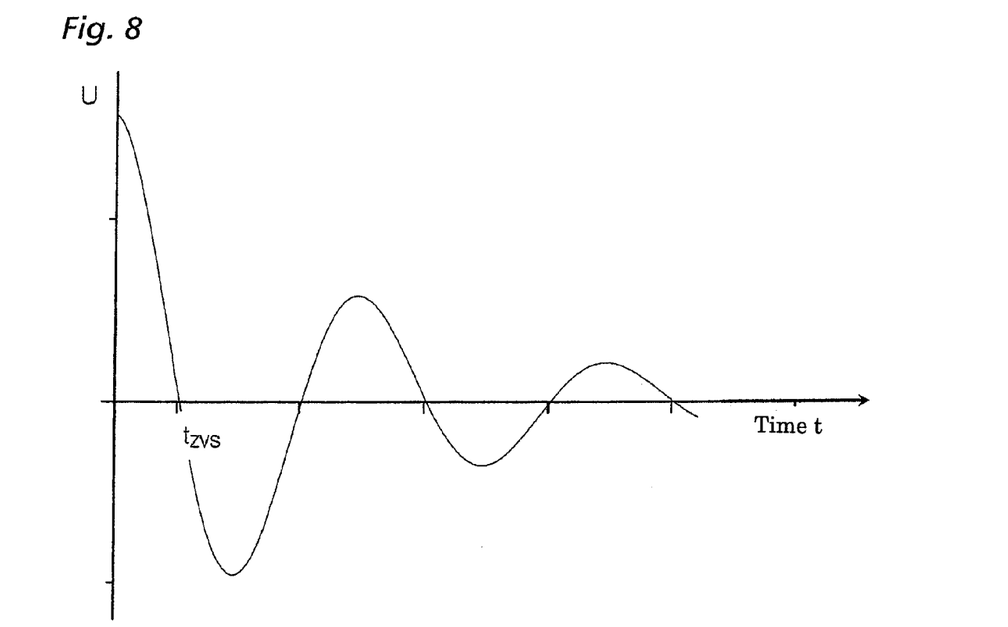

According to the invention, however, the backlight is operated using the zero voltage switching method (ZVS). Here, the switching elements $Q_H$, $Q_L$ are only switched when the voltage across them is zero. This makes low-loss switching possible, since in a voltage-free state no reactive current occurs in the parasitic diodes D1, D2 or in the parasitic capacitors $C_{fet}$. In FIG. 8, a waveform of the output AC voltage U of the AC voltage converter 15 is shown by way of example, where at time $t_{ZVS}$ such a zero voltage switching time occurs.

Figure 9:
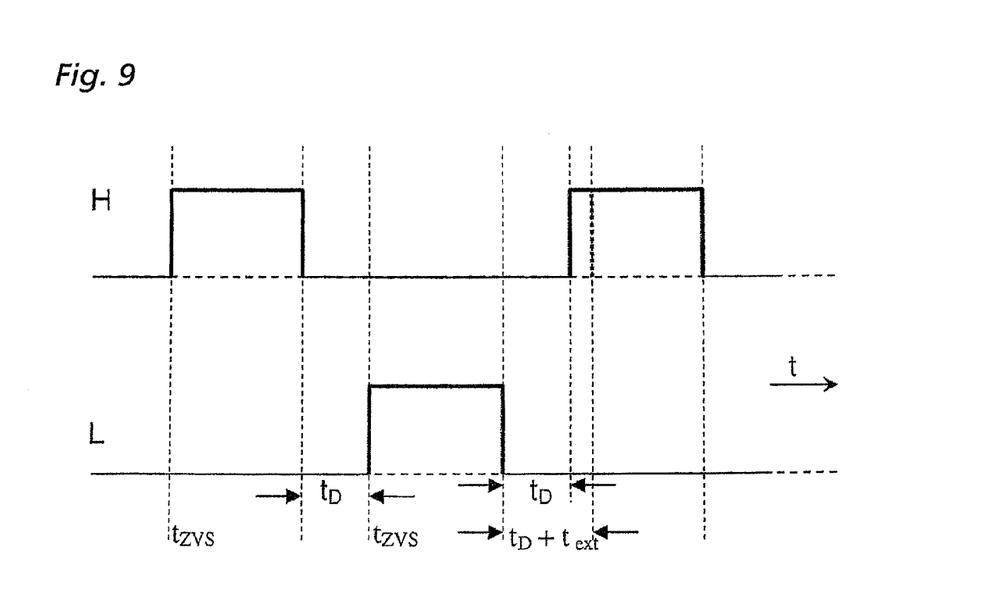

FIG. 9 schematically shows the waveform over time of the control signals H and L for the switching elements $Q_H$ and $Q_L$ respectively. The power switches are switched on alternately. Between the switching intervals, there is a dead time $t_D$ that allows for the switching delay of the switches, thus ensuring that the two switches are never conductive at the same time.

The switches $Q_H$, $Q_L$ are switched on at times $t_{ZVS}$ in which the voltage U has zero crossing (FIG. 8). The switching duration of the two switches is identical so as to ensure symmetric operation of the transformer 16.

The ZVS mode is only made possible, however, if the AC voltage converter 15 is operated at a fixed operating frequency. This means, however, that any change in brightness can no longer be effected through PWM. Instead, according to the invention, the LED current $I_L$ is regulated by changing the PFC output voltage. This means that the input DC voltage of the AC voltage converter 15 is increased or decreased until the desired LED current $I_L$ is achieved.

One difficulty here is that the PFC voltage is not an ideal DC voltage, but has a certain residual ripple. This residual ripple is double the mains frequency and thus lies between 100 Hz and 120 Hz and has an amplitude of approximately 5% of the DC voltage. Due to current regulation, this voltage fluctuation has a direct effect via this input DC voltage on the LED current and thus on the brightness of the light emitting diodes. Under certain circumstances this can be detected in the television picture as a flicker.

To compensate these voltage fluctuations, the present invention provides for the switch-on times of the power switches $Q_H$, $Q_L$ to be changed. At the same time, however, the change should not be excessive, so as not to forfeit zero voltage switching. Typically, the variation in the switch-on times may lie in the vicinity of 5%.

For practical purposes, the compensation can be achieved by prolonging the dead time $t_D$. According to the invention, whenever the hum voltage, i.e. the residual ripple, is positive (when the difference between the hum voltage and DC voltage setpoint is positive) the dead time $t_D$ is extended by a period $t_{ext}$. This goes to reduce the subsequent on-time of the switches, which results in an amplitude modulation of the AC voltage that is in antiphase to the hum voltage, thus achieving almost complete compensation of the residual ripple of the input DC voltage.

Should the maximum possible variation in the switching times not be sufficient to reduce the residual ripple to a satisfactory extent, the leakage inductance of the transformer 16 may also be increased or an additional inductive component may be connected in series to the primary winding of the transformer 16.

Through the audio systems integrated in the television, low-frequency audio signals could cause additional fluctuations in the PFC voltage to occur, which could become noticeable in fluctuations in brightness.

To counteract such fluctuations, the power factor correction circuit may have an additional control that monitors these kinds of fluctuations and which, should they occur, changes the dynamics of the PFC control circuit so as to rapidly counteract such changes in load.

Figure 5:
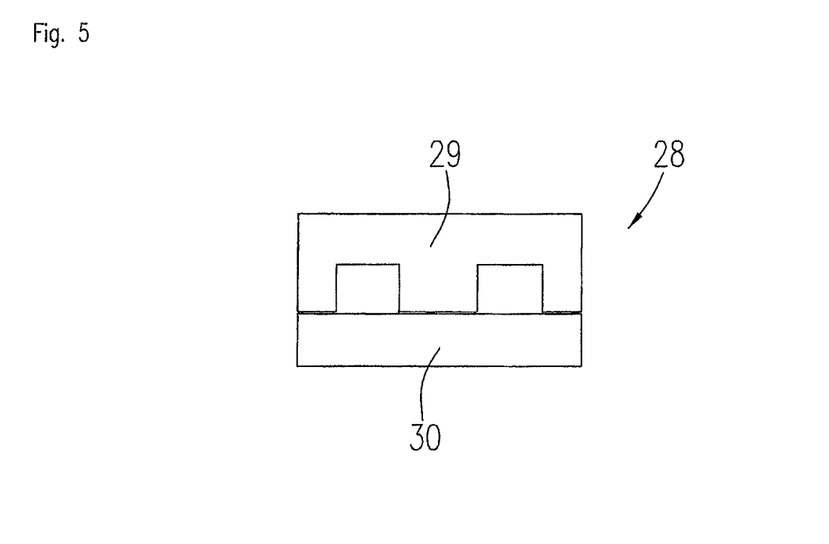

The balancing transformers 23 have ferrite cores 28 that are made up of an E-core 29 and an I-core 30, as shown by way of example in FIG. 5. Layout-integrated coils may be disposed on the core, for example.

Figure 6:
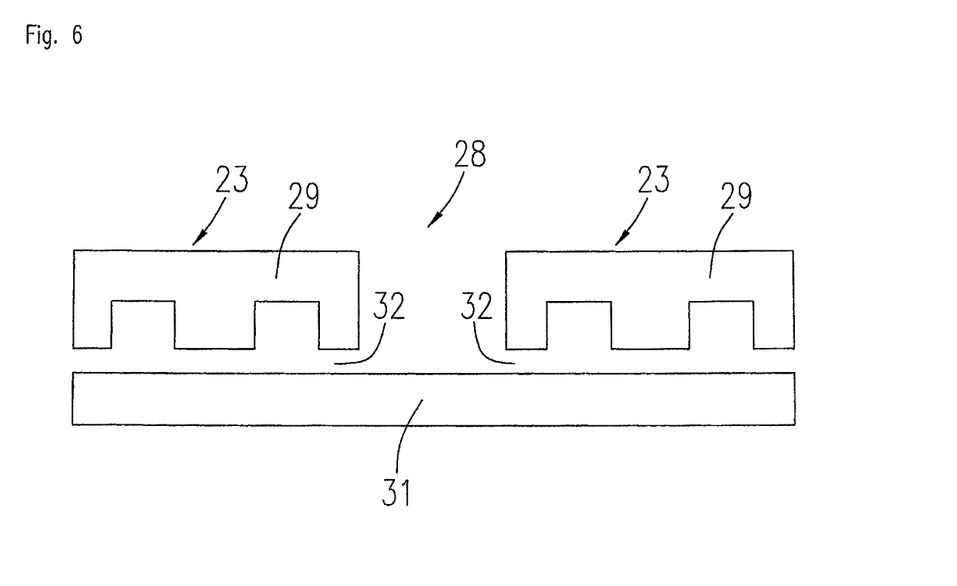

An alternative core arrangement is illustrated in FIG. 6. Here, each transformer 23 has an E-core 29. All the E-cores 29 are connected, however, via a common I-core or a common core plate 31. At the same time it is advantageous, but not essential, if an air gap 32 remains between the E-cores 29 and the I-core 31, the air gap being formed, for example, by non-magnetic plastic spacers.

Figure 3:
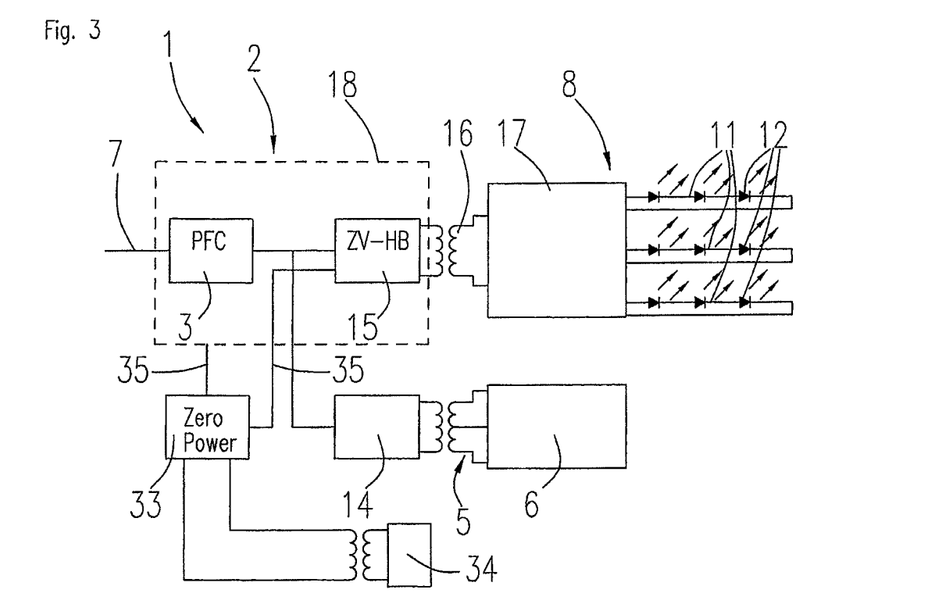

A further embodiment of the invention is shown in FIG. 3. The power supply unit 2 has, in this embodiment, an additional control device 33 for monitoring the standby mode of the television. The control device 33 has a current supply for a signal receiver 34 that is designed to receive a control signal. By means of this signal, the television can, for example, be aroused from its standby mode. The control device 33 is connected via at least one control line 35 to the current supply 2 of the television 1. The primary-side current supply to the power supply unit 2 is controlled over the control lines 35, so that the television in standby mode has practically no current consumption. For this purpose, the PFC 3 and the voltage converter 15, for example, can be connected on the primary side.

As described above, the method according to the invention of controlling the lighting device provides for the LED current to be changed in that the PFC voltage is changed. The AC voltage converter 15 has a fixed converter ratio, so that by changing the input voltage, the output voltage and thus the current on the output side is also changed. According to the invention, the AC voltage converter is operated using the ZVS (zero voltage switching) method.

Although the invention is described on the basis of a television, the invention is not limited to this application. On the contrary, the electrical appliance according to the invention may also be a computer monitor, for example, or a light table or an illuminated wall, used particularly for viewing X-ray images or negatives/slides, or any other lighting in which homogeneous illumination is important. The electrical appliance according to the invention may also have a plurality of independent lighting devices, such as a television with a LED backlight and additional LED ambient lighting, where it is preferably supplied via an adjustable DC/DC converter having the PFC or the first DC/DC converter.

IDENTIFICATION REFERENCE LIST

1 Television
2 Power supply unit
3 Power factor correction circuit (PFC)
4 Voltage converter
5 Secondary voltages
6 Subsystem
7 Mains connection
8 Backlight
9 Voltage converter (standby)
10 Standby circuit
11 LED string
12 Light emitting diodes
13 Voltage converter (DC/DC)
14 Voltage converter (TV DC/DC)
15 Voltage converter (LED DC/AC)
16 High-frequency transformer
17 Balancing network
18 Integrated circuit
19 Circuit branch
20 Bridge rectifier
21 Diode
22 Primary winding
23 Balancing transformer
24 Capacitor
25 Ground
26 Secondary winding
27 Conductor loop
28 Coil core
29 E-core
30 I-core (individual)
31 I-core (common)
32 Air gap
33 Controlling device
34 Signal receiver
35 Control line
U Voltage in the oscillating circuit
$I_L$ LED current
$Q_H, Q_L$ Power switches
$C_S$ Coupling capacitor
D1, D2 Parasitic diodes
$C_{fet}$ Parasitic capacitor
H, L Control signal for the power switches
$t_{ZVS}$ Switching time for zero voltage switching
$t_D$ Dead time
$t_{ext}$ Switching time variation

The invention claimed is:

1. An electrical appliance comprising: a lighting device (8) having light emitting diodes (12) and a power supply unit (2), wherein the power supply unit (2) has a mains connection (7), a DC voltage/AC voltage converter (15) and a high-frequency transformer (16), wherein the lighting device has a current balancing network (17) for controlling the light emitting diodes (12) that is connected to the high-frequency transformer (16), the light emitting diodes (12) are collected in individual LED strings (11) and each of the LED strings (11) has at least one of the light emitting diodes (12), wherein each of the LED strings (11) is disposed in a circuit branch (19) of the current balancing network (17) and the circuit branches (19) are connected in parallel, wherein in each of the circuit branches (19), the LED string (11) is connected to an output of a bridge rectifier (20), one input pole of the bridge rectifier (20) is connected to the high-frequency transformer (16) and an other input pole of the bridge rectifier (20) is connected to a primary winding (22) of a balancing transformer (23) and a secondary winding (26) of the balancing transformer (23) is connected in series to secondary windings (26) of balancing transformers (23) in the parallel circuit branches (19) in a closed conductor loop (27), and a controlling device (33) having a signal receiver (34) by which the primary-side current supply of the power supply unit (2) is controllable using control lines (35).

2. An electrical appliance according to claim 1, wherein in each of the circuit branches (19), a capacitor (24) is connected in parallel to the primary winding (22) of the balancing transformer (23).

3. An electrical appliance according to claim 1, wherein each of the balancing transformers (23) has a core (28).

4. An electrical appliance according to claim 3, wherein the core (28) is made up of an E-core (29) and an I-core (30).

5. An electrical appliance according to claim 3, wherein each of the balancing transformers (23) has an E-core (29) and a common I-core (31) and an air gap (32) is formed between the E-cores (29) and the I-core (31).

6. An electrical appliance according to claim 1, wherein the power supply unit (2) has a further DC/DC converter (14) to provide other voltages (5) for other appliance parts (6).

7. An electrical appliance comprising: a lighting device (8) having light emitting diodes (12) and a power supply unit (2), wherein the power supply unit (2) has a mains connection (7), a DC voltage/AC voltage converter (15) and a high-frequency transformer (16), wherein the lighting device has a current balancing network (17) for controlling the light emitting diodes (12) that is connected to the high-frequency transformer (16), the light emitting diodes (12) are collected in individual LED strings (11) and each of the LED strings (11) has at least one of the light emitting diodes (12), wherein each of the LED strings (11) is disposed in a circuit branch (19) of the current balancing network (17) and the circuit branches (19) are connected in parallel, wherein in each of the circuit branches (19), the LED string (11) is connected to an output of a bridge rectifier (20), one input pole of the bridge rectifier (20) is connected to the high-frequency transformer (16) and an other input pole of the bridge rectifier (20) is connected to a primary winding (22) of a balancing transformer (23) and a secondary winding (26) of the balancing transformer (23) is connected in series to secondary windings (26) of balancing transformers (23) in the parallel circuit branches (19) in a closed conductor loop (27), wherein the power supply unit (2) additionally has a power factor correction circuit (3), and the DC voltage/AC voltage converter (15) is operable using a zero voltage switching method (ZVS) at a fixed operating frequency, an LED current ($I_L$) is regulatable by changing an output DC voltage of the power factor correction circuit (3) and a residual ripple in an input DC voltage of the voltage converter (15) is regulatable through a variation in switching times of the switches (QH, QL) of the voltage converter (15) while maintaining zero voltage switching.

8. A method for controlling the lighting device of an electrical appliance according to claim 7, wherein the output DC voltage of the power factor correction circuit (3) represents the input voltage of the DC voltage/AC voltage converter (15) and the DC voltage/AC voltage converter (15) has at least two switching elements ($Q_H$, $Q_L$), wherein the DC voltage/AC voltage converter (15) is operated using the zero voltage switching method (ZVS) at a fixed operating frequency, the LED current ($I_L$) is regulated by changing the output DC voltage of the power factor correction circuit (3), the residual ripple of the input DC voltage of the voltage converter (15) is regulated by a variation in the switching times of the switches (QH, QL) of the voltage converter (15) while maintaining zero voltage switching.

9. A method according to claim 8, wherein fluctuations in the LED current $I_L$ due to a residual ripple in the input DC voltage are reduced by at least one of increasing a leakage inductance of the transformer (16) or by connecting in series an additional inductive component to the primary winding.

10. A method according to claim 9, further comprising adjusting dynamics of the PFC control circuit to compensate voltage fluctuations in the input voltage caused by low-frequency audio signals.

11. An electrical appliance comprising: a lighting device (8) having light emitting diodes (12) and a power supply unit (2), wherein the power supply unit (2) has a mains connection (7), a DC voltage/AC voltage converter (15) and a high-frequency transformer (16), wherein the lighting device has a current balancing network (17) for controlling the light emitting diodes (12) that is connected to the high-frequency transformer (16), the light emitting diodes (12) are collected in individual LED strings (11) and each of the LED strings (11) has at least one of the light emitting diodes (12), wherein each of the LED strings (11) is disposed in a circuit branch (19) of the current balancing network (17) and the circuit branches (19) are connected in parallel, wherein in each of the circuit branches (19), the LED string (11) is connected to an output of a bridge rectifier (20), one input pole of the bridge rectifier (20) is connected to the high-frequency transformer (16) and an other input pole of the bridge rectifier (20) is connected to a primary winding (22) of a balancing transformer (23) and a secondary winding (26) of the balancing transformer (23) is connected in series to secondary windings (26) of balancing transformers (23) in the parallel circuit branches (19) in a closed conductor loop (27), and a capacitor (24) is connected in parallel to the primary winding (22) of the balancing transformer (23), the capacitor (24) is chosen such that the capacitor (24) and an inductance of the primary winding (22) define a resonance frequency that lies within a frequency range of an AC-voltage of the high-frequency transformer (16).

\* \* \* \* \*